Oct. 4, 1927.
C. C. FARMER
1,644,570
BRAKE CYLINDER DEVICE
Filed Dec. 21, 1926
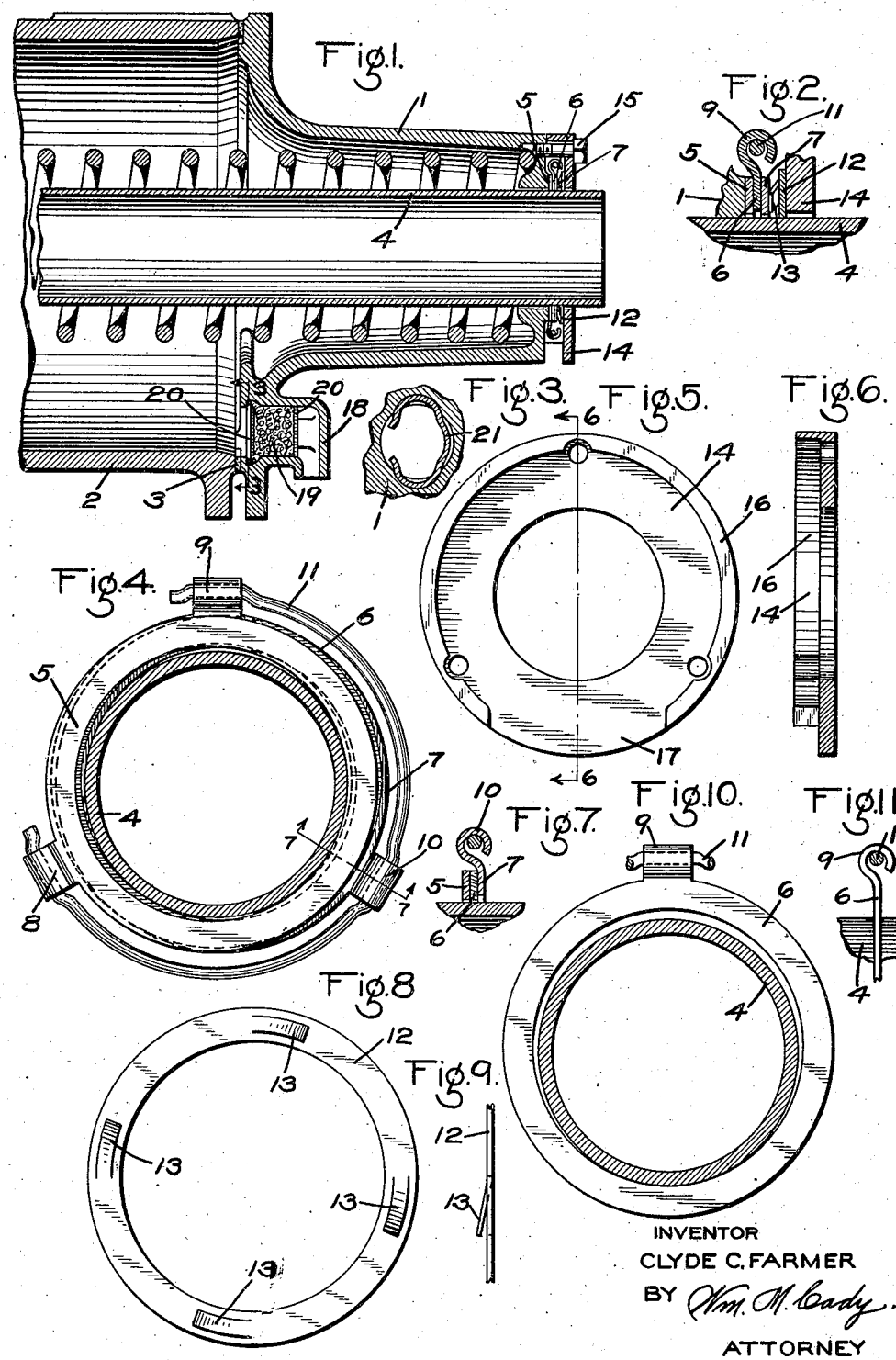
INVENTOR
CLYDE C. FARMER
BY *Wm. M. Cady*
ATTORNEY Patented Oct. 4, 1927.

1,644,570

UNITED STATES PATENT OFFICE.

CLYDE C. FARMER, OF PITTSBURGH, PENNSYLVANIA, ASSIGNOR TO THE WESTINGHOUSE AIR BRAKE COMPANY, OF WILMERDING, PENNSYLVANIA, A CORPORATION OF PENNSYLVANIA.

BRAKE-CYLINDER DEVICE.

Application filed December 21, 1926. Serial No. 156,137.

This invention relates to brake cylinders, and has for its principal object to provide means for preventing the entrance into the brake cylinder, of dirt and water from the atmosphere, around the brake cylinder piston rod.

In the accompanying drawing; Fig. 1 is a sectional view of the non-pressure end of a brake cylinder, showing my improvement applied; Fig. 2 an enlarged sectional view of a portion of the dirt excluding means; Fig. 3 an enlarged section on the line 3—3 of Fig. 1; Fig. 4 an enlarged face view of the assembled deflector rings; Fig. 5 an enlarged face view of the deflector cover plate; Fig. 6 a section on the line 6—6 of Fig. 5; Fig. 7 a section on the line 7—7 of Fig. 4; Fig. 8 a face view of the spring compression plate; Fig. 9 a side view of a portion of the compression plate; Fig. 10 a face view of one of the deflector rings; and Fig. 11 a side view of a portion of the ring shown in Fig. 10.

As shown in Fig. 1, a non-pressure head 1 is secured to the usual brake cylinder 2, a gasket 3 being interposed between the meeting faces of the non-pressure head and the brake cylinder body 2 and extending loosely through an opening at the outer end of the head 1 is the usual hollow brake cylinder piston rod 4.

In order to prevent the entrance of foreign matter from the atmosphere into the chamber at the non-pressure end of the brake cylinder, three or more deflector rings are provided, such as the rings 5, 6, and 7. These rings have a slightly greater inside diameter than the diameter of the piston rod 4, so as to ensure free movement of the rod within the rings, and especially since the rod 4 is made of commercial pipe and is consequently more or less rough and uneven and liable to vary somewhat in diameter.

The deflector rings 5, 6, and 7 are provided with tangs 8, 9, and 10 respectively, each tang being bent into the form of a hook, and the center line of each hook is such that when the deflector plates are superimposed, the center lines of the hooks will be in the same plane. An open ended spring expanding ring 11 is threaded through the hooks of the deflector rings, the ring 11 being provided with offset sections, at which the hooks engage, so that the rings 5, 6, and 7 are held in position on the ring 11 by the offsets.

When in position on the piston rod 4, the deflector ring 5 engages the end face of the head 1 and engaging the exposed face of the deflector ring 7 is a spring compression ring 12 having a plurality of spring clip sections 13 which are cut from the material of the ring and are bent outwardly, as shown in Fig. 9, so as to act as springs engaging the deflector ring 7. The deflector rings and the compression ring are held in place by cover plate 14, adapted to be secured to the end of the non-pressure head by bolts 15 and having a flange 16 for engaging said head, the flange providing a space for the deflector ring assembly and said flange being preferably cut away at the lower portion, as shown at 17 to permit water or dirt, which may collect at the deflector rings, to fall out.

The parts are preferably assembled by slipping the assembled deflector rings over the end of the piston rod 4 and moving the rings so that the ring 5 engages the outer end of the non-pressure head. The compression ring 12 is then slipped over the rod 4 so that the spring clips 13 engage the outer face of the deflector ring 7. The cover plate 14 is then placed in position and is secured to the non-pressure head 1 by bolts 15, the arrangement being such that the spring clips 13 are under compression and thus yieldingly press the deflector plates into engagement.

The expanding spring ring 11 acts on the deflector plates 5, 6, and 7 so as to cause each ring to engage the piston rod 4 at a point diametrically opposite to the lugs in the ring, and since the clearance space between the piston rod and the deflector rings is small, after a slight amount of wear on the rings, each ring will engage the piston rod through a considerable part of the circumference, at least greater than one-third of the circumference, and as a consequence, a tight joint is effected by the combined action of the three rings throughout the circumference, while the face engagement of the superimposed deflector rings will prevent leakage of air at the arcs of circumference where the rings are not in engagement with the piston rod.

As the rings wear, the spring ring 11 operates to maintain the engaging portions of the rings in yielding engagement with the piston rod.

With leakage of air prevented around the piston rod 4 into and out of the chamber within the non-pressure head, it is necessary to provide means for permitting the inhaling and exhaling of air within the non-pressure head, due to the to and fro movement of the brake cylinder piston, and for this purpose, the non-pressure head is provided with an outlet nozzle 18, which is provided with a chamber containing a body of curled hair 19, held in place by perforated plates 20, the inner plate 20 being held in place by a split spring ring 21. The curled hair allows the free flow of air to and from the interior of the non-pressure head, but prevents the passage of foreign material from the atmosphere to said interior.

While I prefer to employ three deflector rings, a greater number may be used, if desired.

Having now described my invention, what I claim as new and desire to secure by Letters Patent, is:—

1. The combination with a non-pressure head of a brake cylinder and a piston rod extending through an opening in said head, of a plurality of deflector rings mounted on said rod adjacent to said opening, and means for pressing said rings into engagement with said piston rod at spaced points.

2. The combination with a brake cylinder piston rod, of a plurality of deflector rings mounted on said rod, and means for pressing said rings into engagement with said rod at spaced points.

3. The combination with a brake cylinder piston rod, of a plurality of deflector rings mounted on said rod, and means for pressing said rings into engagement with said rod at equally spaced points.

4. The combination with a brake cylinder piston rod, of a plurality of deflector rings mounted on said rod, and a spring ring engaging said rings and yieldingly pressing said rings into engagement with said rod at spaced points.

5. The combination with a brake cylinder piston rod, of a plurality of deflector rings in lateral engagement and mounted on said rod, and yielding means engaging said rings and acting to cause said rings to engage said rod at substantially equally spaced points.

6. The combination with a brake cylinder piston rod, of a plurality of deflector rings mounted on said rod and having outwardly extended portions, and a split spring ring engaging said portions to thereby press said rings into engagement with said rod at spaced points.

7. The combination with a brake cylinder piston rod, of three laterally engaging deflector rings mounted on said rod and each provided with an outwardly extended hook portion and a spring ring engaging said hook portions and adapted to yieldingly press said rings into engagement with said rod at substantially equally spaced points.

8. The combination with a brake cylinder piston rod, of a plurality of deflector rings mounted on said rod, a spring ring for pressing said rings into engagement with said rod at spaced points, and means for yieldingly pressing said rings into lateral engagement.

9. The combination with a non-pressure head of a brake cylinder and a piston rod extending through an opening in said head, of a plurality of superimposed rings mounted on said rod and engaging the end portion of said head, means for yieldingly pressing said rings transversely against said rod, and means for yieldingly pressing said rings in lateral engagement.

10. The combination with a non-pressure head of a brake cylinder and a piston rod extending through an opening in said head, of a plurality of superimposed rings mounted on said rod and engaging the end portion of said head, means for yieldingly pressing said rings transversely against said rod, yielding means engaging said rings, and a cover plate secured to said head for holding said yielding means in engagement with said rings.

In testimony whereof I have hereunto set my hand.

CLYDE C. FARMER.